United States Patent
Feldman et al.

(10) Patent No.: US 12,333,346 B2
(45) Date of Patent: Jun. 17, 2025

(54) DISCOVERY AND ROUTING TO INFERENCE SERVERS BASED ON MONITORED VERSION INFORMATION

(71) Applicant: Salesforce, Inc., San Francisco, CA (US)

(72) Inventors: Yuliya L. Feldman, Campbell, CA (US); Seyedshahin Ashrafzadeh, Foster City, CA (US); Alexandr Nikitin, El Sobrante, CA (US); Chirag Rajan, Burlingame, CA (US); Swaminathan Sundaramurthy, Los Altos, CA (US)

(73) Assignee: Salesforce, Inc., San Francisco, CA (US)

(*) Notice: Subject to any disclaimer, the term of this patent is extended or adjusted under 35 U.S.C. 154(b) by 1051 days.

(21) Appl. No.: 17/337,390

(22) Filed: Jun. 2, 2021

(65) Prior Publication Data
US 2022/0391749 A1    Dec. 8, 2022

(51) Int. Cl.
*G06F 9/50* (2006.01)
*G06F 8/60* (2018.01)
*G06F 9/455* (2018.01)
*H04L 67/133* (2022.01)
*G06N 20/00* (2019.01)

(52) U.S. Cl.
CPC .............. *G06F 9/5072* (2013.01); *G06F 8/60* (2013.01); *G06F 9/45558* (2013.01); *G06F 9/5077* (2013.01); *H04L 67/133* (2022.05); *G06F 2009/45562* (2013.01); *G06F 2009/45595* (2013.01); *G06N 20/00* (2019.01)

(58) Field of Classification Search
CPC ....... G06N 20/00; G06F 8/60; G06F 9/45558; G06F 9/5072; G06F 9/5077; G06F 2009/45562; G06F 2009/45595; H04L 67/133; H04L 67/60; H04L 67/51
See application file for complete search history.

(56) References Cited

U.S. PATENT DOCUMENTS

| | | | |
|---|---|---|---|
| 7,730,478 B2 | 6/2010 | Weissman | |
| 9,189,521 B2 | 11/2015 | Rajan et al. | |
| 9,286,343 B2 | 3/2016 | Kim et al. | |
| 9,760,594 B2 | 9/2017 | Kim et al. | |
| 10,108,648 B2 | 10/2018 | Rajan et al. | |
| 10,152,511 B2 | 12/2018 | Rajan et al. | |
| 10,990,850 B1 * | 4/2021 | Chen | G06V 10/7747 |

(Continued)

OTHER PUBLICATIONS automl.org, "AutoML . . . ", AutoML.org: Freiburg-Hannover, Available Online at <https://www.automl.org>, retrieved on Mar. 9, 2021, 1 page.

(Continued)

*Primary Examiner* — Benjamin C Wu
(74) *Attorney, Agent, or Firm* — Nicholson, De Vos, Webster & Elliott, LLP

(57) ABSTRACT

A method performs service discovery in a machine learning service. The method includes detecting initialization of at least one service container, identifying label information in the at least one service container, collecting the label information for the initializing at least one service container, and storing the label information in a routing information storage to enable routing of requests to the at least one service container.

15 Claims, 5 Drawing Sheets

(56) References Cited

U.S. PATENT DOCUMENTS

| | | | |
|---|---|---|---|
| 11,657,069 B1* | 5/2023 | Narayanaswamy | G06N 20/20 707/602 |
| 12,052,285 B1* | 7/2024 | Anjaneyapura Range | H04L 63/20 |
| 2012/0330926 A1 | 12/2012 | Rajan et al. | |
| 2017/0093921 A1* | 3/2017 | Duan | H04L 63/1408 |
| 2017/0374101 A1* | 12/2017 | Woolward | H04L 63/0263 |
| 2019/0108248 A1 | 4/2019 | Rajan et al. | |
| 2019/0335004 A1* | 10/2019 | Yang | G06F 8/316 |
| 2020/0314015 A1* | 10/2020 | Mariappan | H04L 41/0895 |
| 2020/0356415 A1* | 11/2020 | Goli | G06N 20/00 |
| 2022/0108035 A1* | 4/2022 | Mehta | G06N 20/00 |
| 2022/0237505 A1* | 7/2022 | Feldman | G06F 9/45558 |
| 2022/0237506 A1* | 7/2022 | Feldman | G06F 9/45558 |
| 2022/0318647 A1 | 10/2022 | Ashrafzadeh et al. | |
| 2022/0382539 A1 | 12/2022 | Gumashta et al. | |
| 2022/0382601 A1 | 12/2022 | Feldman et al. | |
| 2022/0391199 A1* | 12/2022 | Ashrafzadeh | G06F 11/3476 |
| 2022/0391239 A1 | 12/2022 | Feldman et al. | |
| 2022/0391747 A1* | 12/2022 | Ashrafzadeh | G06N 20/00 |
| 2022/0391748 A1 | 12/2022 | Nikitin et al. | |
| 2022/0391749 A1* | 12/2022 | Feldman | G06F 9/5072 |
| 2022/0414547 A1* | 12/2022 | Ashrafzadeh | G06F 18/29 |
| 2022/0414548 A1* | 12/2022 | Ashrafzadeh | G06F 18/25 |
| 2023/0110057 A1* | 4/2023 | Kan | G06F 16/258 707/723 |
| 2023/0111775 A1* | 4/2023 | Lee | G06N 20/00 706/12 |

OTHER PUBLICATIONS

Microsoft Research, "AutoML", Available Online at <https://www.microsoft.com/en-us/research/project/automl/>, retrieved on Mar. 9, 2021, 2 pages.

Nabar, Shubha, "Open Sourcing TransmogrifAI: Automated Machine Learning for Structured Data", Available Online at <https://engineering.salesforce.com/open-sourcing-transmogrifai-4e5d0e098da2>, Aug. 16, 2018, 10 pages.

* cited by examiner

DISCOVERY AND ROUTING TO INFERENCE SERVERS BASED ON MONITORED VERSION INFORMATION

TECHNICAL FIELD

One or more implementations relate to the field of service discovery; and more specifically, to the service discovery or the discovery of inference servers for a machine learning infrastructure.

BACKGROUND ART

Containers are a logical packaging in which applications can execute that is abstracted from the underlying execution environment (e.g., the underlying operating system and hardware). Applications that are containerized can be quickly deployed to many target environments including data centers, cloud architectures, or individual workstations. The containerized applications do not have to be adapted to execute in these different execution environments as long as the execution environment support containerization. The logical packaging includes a library and similar dependencies that the containerized application needs to execute.

However, containers do not include the virtualization of the hardware of an operating system. The execution environments that support containers include an operating system kernel that enables the existence of multiple isolated user-space instances. Each of these instances is a container. Containers can also be referred to as partitions, virtualization engines, virtual kernels, jails, or similar terms.

Machine learning is a type of artificial intelligence that involves algorithms that build a model based on sample data. This sample data is referred to as training data. The trained models can generate predictions, a process also referred to as scoring, based on new data that is evaluated by or input into the model. In this way, machine learning models can be developed for use in many applications without having to be explicitly programmed for these uses.

Containers can be used in connection with machine-learning serving infrastructure. Machine-learning serving infrastructures enable the execution of machine-learning models and provide services to the machine-learning models. Each machine-learning model can be separately containerized with all its required dependencies.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
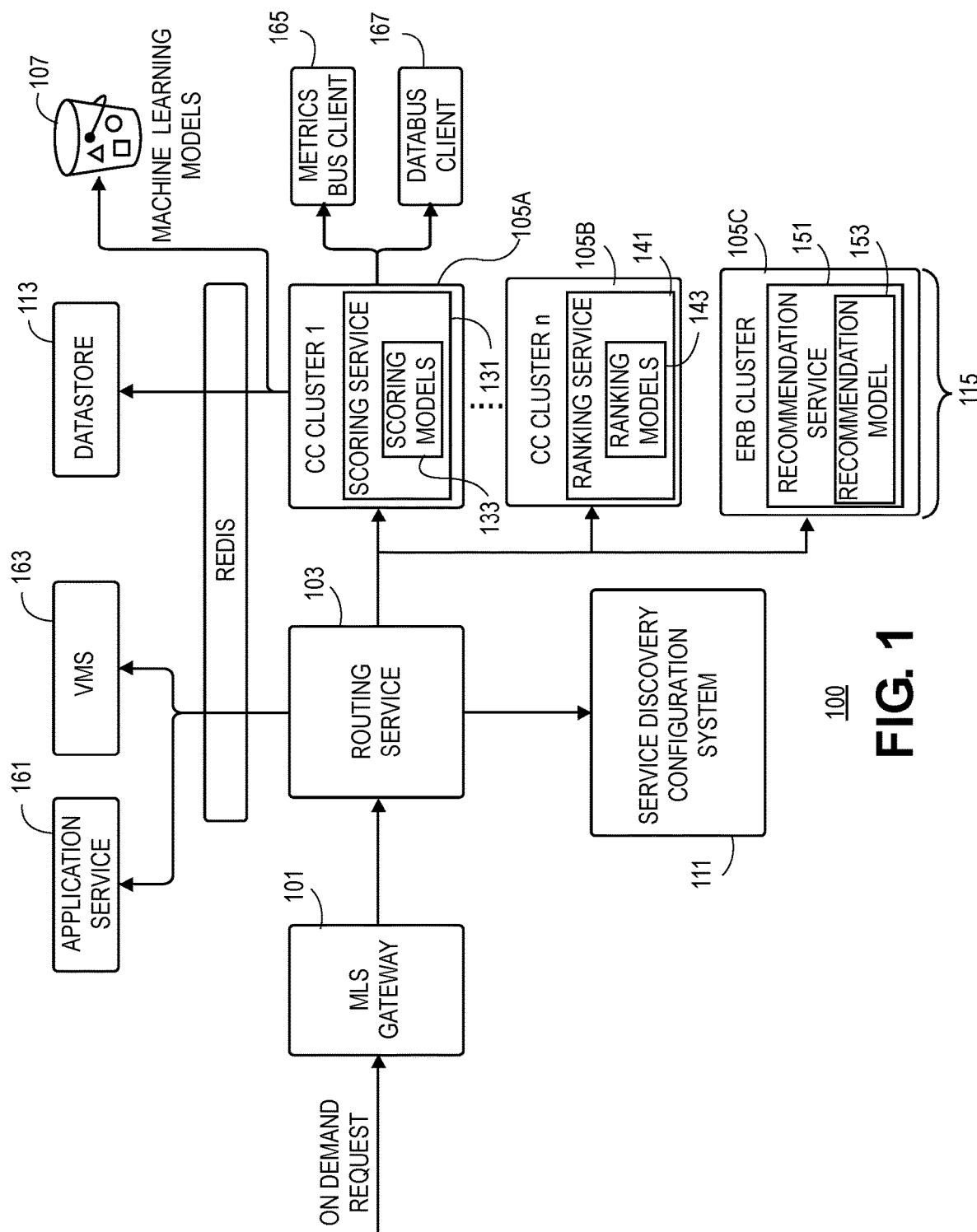
FIG. 1 is a diagram of one example implementation of a machine-learning serving infrastructure that supports a multi-tenant system according to some example implementations.

The following description describes implementations for service discovery using a node based or cluster based discovery process where the nodes and clusters do not perform a registration process when they come online. The nodes or clusters contain metadata describing the characteristics of their service. When loaded by the node and cluster orchestration system their metadata is examined and collected by the service discovery and configuration system making the collected data available for the use of the routing system to service requests in a machine-learning (ML) serving infrastructure. Similarly, the service discovery and configuration system can monitor the nodes and cluster during their continued operation to detect when ML models are loaded by the nodes to enable routing of the requests to the appropriate nodes. Service discovery in the ML serving infrastructure can relate to inference server discovery, where the inference servers are serving containers providing ML models that service requests from client applications.

ML models are utilized in support of applications that make requests of the ML serving infrastructure. ML models are executed or supported by nodes (i.e., serving containers) within the ML serving infrastructure. The nodes are hosted by a cluster in the ML serving infrastructure where each cluster implements a particular ML framework. There are a wide variety of variety of ML frameworks or libraries (e.g., TransmogrifAI/SparkML Lib, TensorFlow, XGBoost), APIs (HTTP/gRPC, Java interface), programming languages (Java, Python), and related technologies that can be employed in any combination in an ML serving infrastructure. There can be multiple groups that are creating ML models that will be deployed in the same ML serving infrastructure such as in the case where the ML serving infrastructure supports multi-tenancy. The ML models can have different requirements, use cases, and needs. Hence there can be multiple ways to integrate ML models and serve them.

As used herein, an application can be any program or software to perform a set of tasks or operations. A machine-learning (ML) model can be a set of algorithms and statistical data structures that can be trained to perform a specific task by identifying patterns and employing inference instead of using explicit instructions. The ML model can be trained for the task using a set of training data.

A machine-learning (ML) serving infrastructure can be automated and organized to support multi-tenancy where containers can be used to execute the ML models that can service the applications and users of tenants in a multitenant system. Within a multitenant system, a software application is designed to provide each tenant with a tenant-specific view of the application including access only to tenant-specific data, configuration, user management, and similar tenant properties and functionality. A tenant can be a group of users who are part of a common organization or share common access privileges to the multi-tenant system and the associated software applications.

FIG. 1 is a diagram of one example implementation of an ML serving infrastructure that supports a multi-tenant system. The machine-learning serving infrastructure 100 includes a machine-learning service (MLS) gateway 101, routing service 103, routing manager 175, service discovery and configuration system 111, set of serving containers 115, and data stores, along with other supporting infrastructure.

A serving container 115 (i.e., a 'node') can be an isolated execution environment that is enabled by an underlying operating system, and which executes the main functionality of a program such as an ML model. A serving container 115 can host any number of ML models for any number of tenants. Serving containers 115 can be organized as a cluster. The cluster can be a group of similar entities, such that a cluster of serving containers can be a group of serving container instances or similar grouping. An ML serving infrastructure 100 can host any number of serving containers 115 or clusters of serving containers. Different clusters can host different versions or types of ML models.

In some example implementations, a cluster of serving containers 115 can host all ML models of the same version for all tenants. This organization of the cluster can be limited by the number of ML models that a single-serving container can hold. The ML serving infrastructure 100 can scale to accommodate further additions of ML models even in cases where the number or variety of ML models exceed the capacity of the serving containers 115 in the cluster. Since each ML model's size, which can range from hundreds of kilobytes (KB) to hundreds of megabytes (MB), initialization time, and the number of requests that are serviced, can vary widely based on each tenant's underlying database and usage, some clusters of serving containers 115 may have a high resource usage, while other clusters of serving containers 115 may have a low resource utilization. The resource usage, failure, or addition of any server container in a cluster of serving containers can create the need to rebalance the supporting resources in the clusters of serving containers. When changes in the number or resource usage of the serving containers 115 are implemented, then the routing service 103 can manage the load balancing and routing of requests according to the changes in the organization of the serving containers.

A routing service 103 can be implemented as a set of routing containers, or cluster of routing containers, each implementing instances of the routing service 103 functions or subsets of these functions. The routing service 103 can authenticate any request from any tenant, and then route the request for service by ML models to any serving container 115 in a cluster of serving containers.

The ML serving infrastructure 100 receives requests from tenants via a machine-learning service (MLS) gateway 101 or a similar interface. The MLS gateway 101 or similar interface receives a request from a tenant application and identifies a version or instance of an ML model associated with the request. The MLS gateway 101 or similar interface identifies model information associated with ML models corresponding to a cluster of available serving containers associated with the version of the ML model. The MLS gateway 101 uses the model information to select a serving container from the cluster of available serving containers. If the ML model is not loaded in the serving container, the ML serving infrastructure 100 loads the ML model in the serving container. If the ML model is loaded in the serving container, the system executes, in the serving container (e.g., 105A-C), the ML model (e.g., the scoring models 133) on behalf of the request. The ML serving infrastructure 100 responds to the request based on executing the appropriate ML model on behalf of the request.

In one example, the ML serving infrastructure 100 receives a request for scoring a business opportunity from a Customer Relationship Management (CRM) application or similar application and identifies the request requires executing a version of a particular opportunity scoring ML model. The routing service 103 identifies ML model information including memory and CPU requirements for the scoring ML models in the cluster of scoring serving containers. The routings service 103 applies a load balancing algorithm, resource management algorithm (e.g., a multi-dimensional bin-packing algorithm) to the collected model information to select the serving container 115 that has the best combination of available resources to execute a copy of the specific ML model associated with an incoming request.

If a copy of the specific ML model needed to service the incoming request is not already loaded in a serving container 115, then an existing or new serving container loads the required ML model. When a copy of the specific ML model is verified to be loaded in the serving container, then the specific ML model executes the requested service or function, as specified in the received request, in the serving container. A score or similar prediction is thereby generated by the ML model and the ML serving infrastructure 100 can then respond to the request with the generated score via the MLS gateway 101.

The ML serving infrastructure 100 can be implemented in a cloud computing environment in which data, applications, services, and other resources are stored and delivered through shared data centers. The ML serving infrastructure 100 can be implemented via any other type of distributed computer network environment in which a set of servers control the storage and distribution of resources and services for different client users.

The clusters of the example implementation of the ML serving infrastructure 100 can be two of any number of clusters that are serving containers for scoring services. Where a scoring service can be a serving container for any number of ML models that perform scoring, i.e., scoring models. Each cluster can execute different sets of scoring services (e.g., different serving containers) for executing different varieties of ML models (e.g., scoring models). The variation of clusters can correlate with serving different ML frameworks such that a given cluster provides a specific ML framework. Thus, each cluster can correlate with a particular ML framework (e.g., AutoML or similar frameworks). Similarly, each specific ML framework can have a version such that each cluster can offer a specific version of an ML framework. Multiple clusters can offer the same version of an ML framework where there is high usage or demand for that framework as there can be a limit on the number of models per cluster or container and similar load balancing concerns. An incoming request can be serviced by a single ML model of a single cluster (e.g., a scoring model of a given scoring service) or the incoming request can be sub-divided to be serviced by multiple clusters, service containers, and ML models. In some implementations, the clusters and serving containers operate other similar types of ML models other than scoring ML models such as ranking and recommendation models. Scoring is provided as an example rather than by limitation. The clusters can include in some implementations of ranking services and recommendation services, which support ranking models, and recommendation models, respectively. In the illustrated example, the scoring service 133 is an example of a scoring container that executes a set of scoring models 133, the ERB cluster 105C provides a recommendation service 151 container that can implement recommendation models 153 or other functions, and other functions can be supported in other container types (e.g., cc cluster 105B provides ranking service 141 container that service ranking models 143).

In some implementations, the routing service 103 can split the incoming request into separate sub-requests, and then route the sub-requests to their corresponding clusters of serving containers. Although these examples describe the clusters 115 of serving containers that serve one version of the scoring type of ML models, one version of the recommending type of ML models, and one version of the ranking type of machine-learning models, any clusters of any serving containers may serve any number of versions of any number of any types of any ML models and all permutations thereof.

In some implementations, each of the serving containers 115 is inspected for service related metadata when loaded or in response to changes to the serving containers 115 by service discovery and configuration system 111. The service discovery and configuration system 111 can reduce load times by avoiding an explicit registration system for the serving containers 115. The service discovery and configuration system 11 providing the serving container's registration information, such as the host, the port, functions, or similar information. When any of the serving containers 115 is no longer available or becomes unavailable, the discovery and configuration system 111 deletes the unavailable serving container's registration information. An available serving container 115 can be referred to as an actual serving container. In other embodiments, a registration process is not required and the service discovery and configuration system 111 can monitor the loading of containers and models to collect the characteristics of each that enable proper routing of requests to these containers and models.

The service discovery and configuration system 111 can be implemented by HashiCorp Consul, Apache Zookeeper, Cloud Native Computing Foundation etcd, Netflix eureka, or any similar tool that provides service discovery and/or a service registration system. The discovery and configuration system 111 can track container information about each serving container and model information about each serving container's machine-learning models. In other implementations, this information can be stored in other locations such as datastore using a format or organization. Container information can be data about an isolated execution environment, which executes the main functionality of an ML model. ML model information can be data about the algorithms and/or statistical models that perform a specific task effectively by relying on patterns and inference instead of using explicit instructions.

The routing service 103 can be deployed with multiple redundant and/or distributed instances so that it is not a single point of failure for the ML serving infrastructure 100. In some implementations, one instance of the routing service 103 acts as a master, while other instances of the routing service 103 are in a hot standby mode, ready to take over if the master instance of the routing service fails, or perform some operations at the direction of the master instance.

A data model information in the service discovery and configuration system 111 provides information about which serving containers 115 are expected to host-specific ML models (e.g., specific version) and which serving containers actually host the specified ML models. The serving containers 115 can coordinate with the service discovery and configuration system 111 to track the actual models being hosted at each container using a model mapping structure in the discovery and configuration system 111. Each of the serving containers 115 can manage a list of executing ML models. If the serving container list does not match the list of expected ML models that a serving container receives, the serving container can load or delete any ML models as needed, and then update its list of executing ML models accordingly.

Every time an ML model is loaded, the discovery service and configuration system can detect and collect information about the ML model including version information in the data model information or the data model information is similarly updated. Therefore, the routing service 103 can route requests for a particular ML model to the serving containers.

When any of the executing serving containers 115 in any of the executing clusters of serving containers dies unexpectedly, or gracefully, the serving container's heartbeat to the service discovery and configuration system 111 fails. The ML serving infrastructure 100 removes the data for the failed serving container from its directory, files, or similar data structures in the service discovery and configuration system 111.

When requests are received by the routing service 103 via the MLS gateway 101, a check of the mapping is made to determine if a requested ML model is executing using the service discovery and configuration system 111. If found, then the routing service 103 can forward the requests (or divide the request into a set of sub-requests) to the identified serving containers 115. If a ML model for the request is not found, then the ML model can be loaded from a datastore, specialized database, or store (e.g., a simple storage service (S3)), or similar location into a selected cluster and serving container.

In some implementations, the ML serving infrastructure 100 can include any number of additional supporting features and functions. These additional supporting features and functions can include application services 161, version management services (VMS) 163, redistribution services, and similar functions and services. The application services can be any number, combination, and variety of functions and services for supporting tenant applications and the ML serving infrastructure 100. The VMS can be any number, combination, and variety of functions and services for supporting different versions of ML frameworks, ML models, and similar components of the machine-learning serving infrastructure 100. The redistribution services can be any number, combination, and variety of interconnecting services to enable communication between the components of the ML serving infrastructure 100 and supporting components. In some example implementations, serving containers can interface with or support metrics bus clients, databus clients, and similar components. The metrics bus clients can be services that gather or monitor metrics of the serving containers 115 and similar aspects of the ML serving infrastructure 100. Similarly, the databus clients can be services and functions that enable data communication and access between the serving containers 115 and other components of the ML serving infrastructure 100.

Exemplary Use with a Container Orchestration System (COS)

Figure 2:
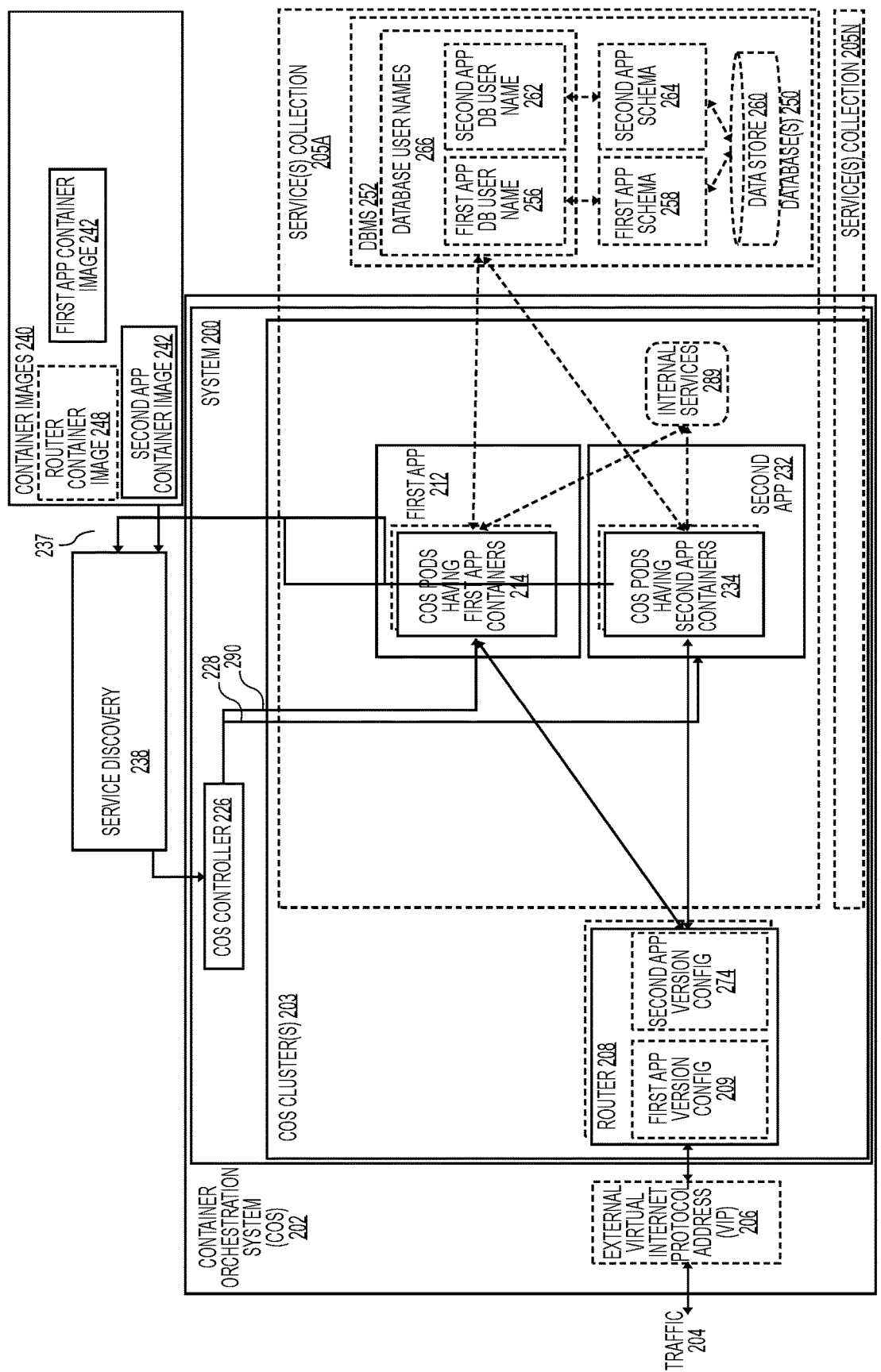
FIG. 2 is a diagram of one example implementation of a container orchestration system with service discovery according to some example implementations.

FIG. 2 is a block diagram of the above discussed release orchestration technique used with a Container Orchestration System (COS), according to some implementations. FIG. 2 illustrates a COS 202 (e.g., Kubernetes, Docker Swarm, or similar system) to facilitate the communication of production traffic 104 (e.g., via an external virtual internet protocol address (VIP) 206 of the COS 202) with a system 200 within the COS 202.

Overview

The system 200 provides an example implementation for some components of the ML serving infrastructure such as the clusters and nodes (i.e., containers) of the ML serving infrastructure. The system 200 provides support for loading the cluster and nodes of the ML serving infrastructure. In addition, the service discovery 138 component monitors the loading and actions of the clusters and nodes to collect the metadata and record the information needed for the routing of requests to the appropriate cluster and nodes by the routing service. The service discovery 138 can be a component of the service discovery and configuration system or can work in coordination therewith.

Incoming traffic 104 (e.g., requests from tenant applications or other client applications) is routed by router 108 (e.g., a Layer 7 (also referred to as an L7 or application layer), which may be implemented using, for example, the open source Envoy Project) to and from a first app 112 (also referred to as the first application (app) version) that runs in a number of COS pods having first app version containers 214. In some implementations, the router 208 includes first app version configuration 209 that causes the traffic 204 to be routed to the first app 112. Other tenant applications can be services by other apps (e.g., second app 232 implemented in respective COS pods 234).

In some implementations, the traffic 104 causes the application (app) to communicate with the set of one or more database(s) 250 (one or more of which may be stateful databases) provided through a database management system (DBMS) 252. In some such implementations, the DBMS 252 is configured with a database username that is assigned to the first app version (illustrated as first app version DB user name 256) and a database schema (illustrated as first app version schema 258) for accessing data store 260. In some such implementations, a separate database user name (illustrated as the second app version DB user name 262) is assigned (which includes the creating and preloading of a user name if there is not an existing one that can be assigned) to the second app version, and any required database schema for the second app version (illustrated as second app version schema 264) is also preloaded, for the second app version to use to access the data store 260. While some implementations use different database usernames 266 to separate communications from the different app versions, alternative implementations may use another technique (e.g., inclusion of separate identifiers).

Container image(s) 240, including a second app version container image 242, are monitored by the service discovery 238 to collect information about the containers which the COS controller 226 manages to enable routing to the containers 214, 234.

In implementations in which the production traffic 104 causes the application (app) to communicate with the set of one or more database(s) 250, the second app version container image 242 includes code and database release artifacts (e.g., procedural language/structured query language (PL/SQL) Scripts; database query optimization statistics and/or hints; etc.). The code, when executed within the COS pods having the second app version containers 234, causes them to participate in the election of a leader (e.g., using an exclusive semaphore), and the elected leader then prepares the database(s) 250 by loading the database release artifacts using the second app version DB user name 262. In addition, in implementations where the traffic causes the application (app) to communicate with the set of one or more database(s) 250, the second app version containers 234 communicate with the database(s) 250.

In some implementations, the apps 214, 234 rely on one or more internal services 289 (e.g., a search service, a message queue service, a cache service), and this is addressed by having the first app version containers 214 and the second app version containers 234 communicate separately with these internal services.

Also, in some implementations, a construct (referred to herein as a service(s) collection) is used to create, organize, and monitor a set of one or more service(s) to be provided. FIG. 4 illustrates the option of having multiple service(s) collection by showing service(s) collections 205A-N. A service(s) collection is a collection of pods (e.g., kpods), and possibly multiple microservices (e.g., Kubernetes services), that each provides one or more service(s). A service(s) collection is a collection in that it: 1) provides multiple instances of the same service and/or microservice through different COS pods; and/or 2) provides different types of services and/or microservices through different COS pods. Additionally or alternatively, implementations may support multiple COSs 202 in different data centers in different geographic locations, and each of the COS controllers 226 of these COSs 202 may track the service(s) collections IDs of the service(s) collection they are hosting. Additionally, or alternatively, different tenants (or groups of tenants) may be assigned to different (possibly identical) service(s) collections 205.

Figure 3:
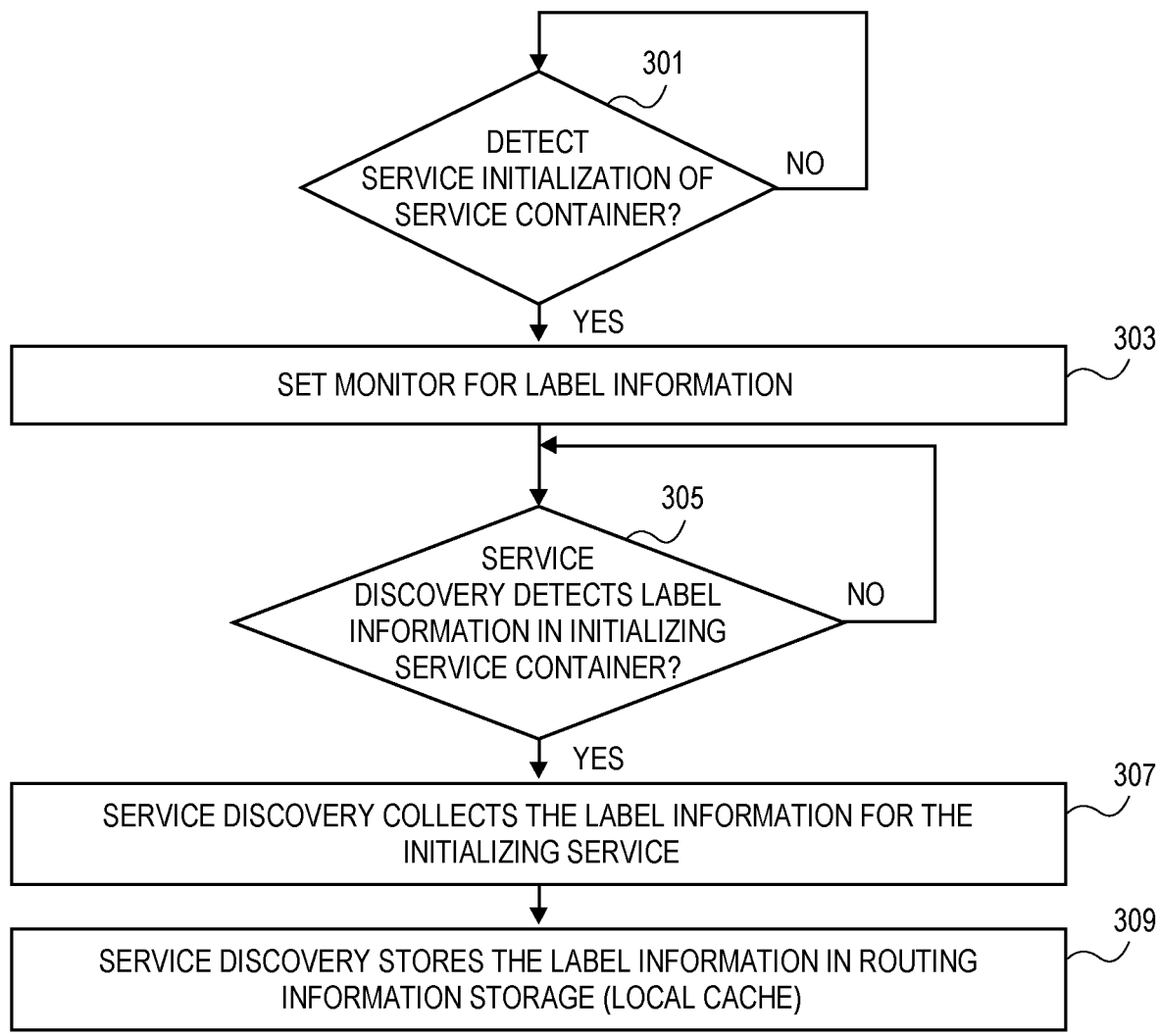
FIG. 3 is a flowchart of one example implementation of a service discovery process according to some example implementations.

FIG. 3 is a flowchart of one example implementation of a service discovery process according to some example implementations. The service discovery process can be implemented by a service discovery and configuration system that can implement or define an application programming interface, utilize a service mesh, and/or utilize similar technologies to provide service discovery and enable routing without requiring a registration process by the serving containers. Service discovery can operate as cluster-based service discovery and/or node based service discovery.

Cluster-based service discovery is a type of service discovery that does not differentiate between pods in the cluster and will call a service endpoint however it will be defined in the service itself. In some implementations, the cluster-based service discovery can be implemented on a kubernetes COS. In the ML servicing infrastructure, to successfully onboard a prediction service, there are labels or similar metadata that need to be defined in a deployment specification of the prediction service or in a similar location. The labels can define the information needed for routing the prediction requests to the appropriate cluster. In an example implementation the labels can have a format and syntax such as:

labelName: ${LABEL_NAME:u_servicename}
    labelVersionName: ${VERSION_LABEL_NAME:u_version}
    labelPortName: ${PORT_LABEL_NAME:u_service_port}

The u_servicename is how the name of the scoring service is defined in a service mesh or similar services communication technology. The u_service_port is the port on which the scoring service listens. The u_version is the name of the version of a scoring service, which will be used to support multi-version deployments. For example, intent-predictor is a service name, but the version is multilingual-1-2-3. In this way eventually u_version will determine the host/domain/URL to the final destination: multilingual-1-2-3.hawking.svc.mesh.sfdc.net:PORT Node based service discovery is a type of service discovery where there is service discovery based on specific nodes endpoints. In some implementations, the node based discovery utilizes on a StatefulSet data structure in kubernetes to differentiate separate pods based on service mesh specification for the StatefulSet. To successfully onboard a prediction service for node based discovery, a set of labels are defined in the pod specification. In an example implementation the labels can have a format and syntax such as:

labelName: ${LABEL_NAME:u_servicename}
labelVersionName: ${VERSION_LABEL_NAME:u_version}
labelPortName: ${PORT_LABEL_NAME:u_service_port}

The u_servicename is how the name of the scoring service is defined in a service mesh or similar services communication technology. The u_service_port is the port on which the scoring service listens. The u_version is the name of the version of a scoring service, which can be used to enable support for multi-version deployments. For example, opscoring is a service name and the version is ai-3-103-1. In this example, the u_servicename and u_version will determine the host/domain/URL to final destination:

opscoring-ai-3-103-1-0.opscoring.hawking.svc.mesh.sfdc.net:PORT—container 0
opscoring-ai-3-103-1-1.opscoring.hawking.svc.mesh.sfdc.net:PORT—container 1
opscoring-ai-3-103-1-2.opscoring.hawking.svc.mesh.sfdc.net:PORT—container 2

In some implementations, cluster discovery can be utilized when all the containers are equal—every container serves the same number of models, no need to shard models to divide them into smaller groups. Node discovery can be utilized when not every container should be serving every model. Need more smarts into dividing data space to serve just a subset of the models on any given container.

In one example implementation, as shown in FIG. 3, the process for service discovery implemented by the service discovery and configuration system. The process can be triggered by the detection of service initialization of service container (Block 301). The service discovery process can utilize a Kubernetes API, or similar mechanism to detect an initialization of a cluster or node (e.g., a serving container) for the ML serving infrastructure. In response to detecting the initialization of a cluster or node, then the process can set a monitoring process to check for label information of the cluster or node (Block 303). The monitor process can periodically or continuously check for label information or similar metadata for the cluster or node.

Where the service discovery detects label information in and initializing or operating service container (Block 305), then the service discovery can collect the label information (Block 307). The collected label information can be stored in a routing information storage (local cache) or similar location where the routing service can utilize the information to route requests to the appropriate serving container (Block 309).

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 4A:
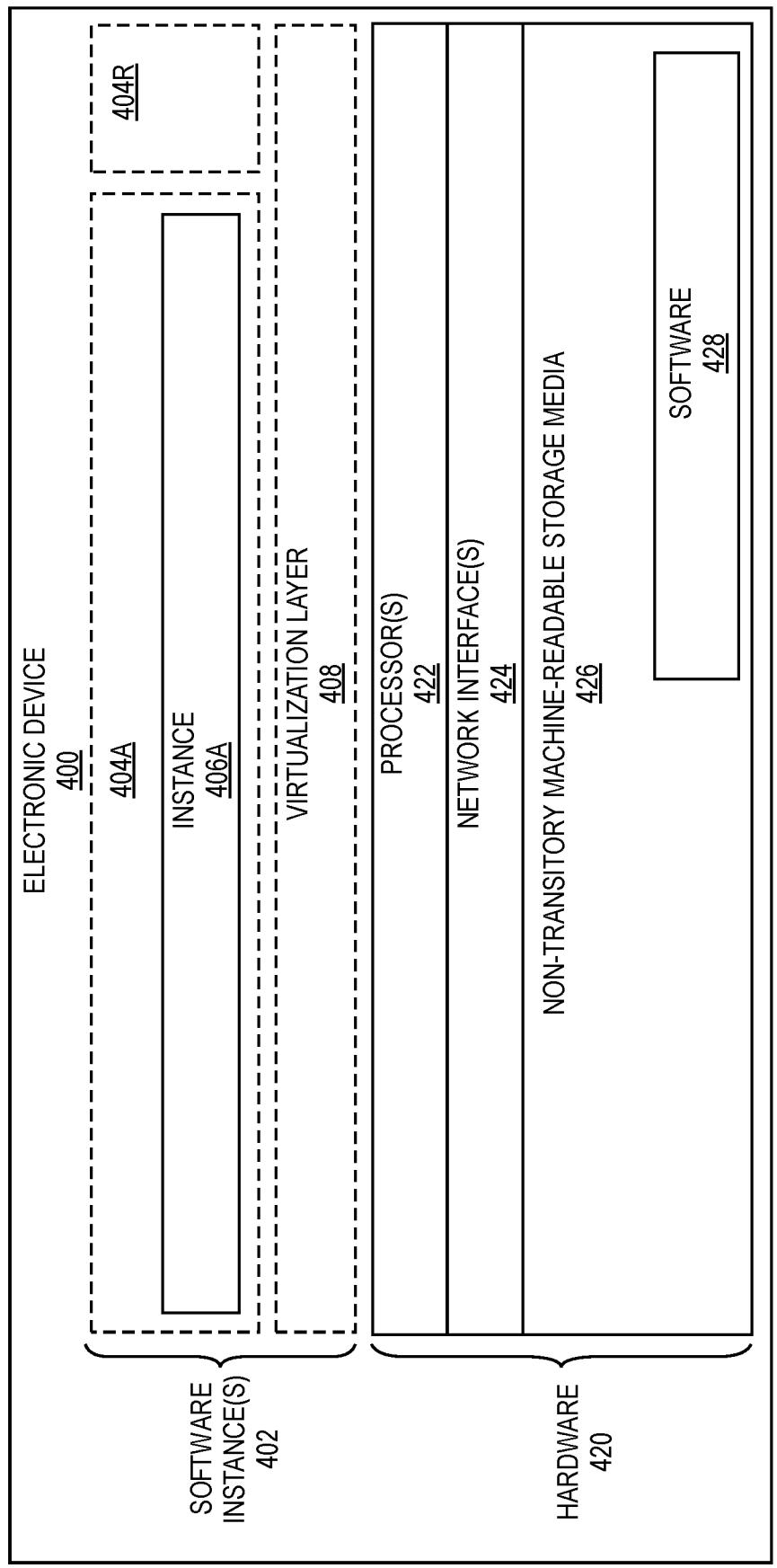
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and machine-readable media 426 having stored therein software 428 (which includes instructions executable by the set of one or more processor(s) 422). The machine-readable media 426 may include non-transitory and/or transitory machine-readable media. Each of the previously described clients and the service discovery and configurations system may be implemented in one or more electronic devices 400. In one implementation: 1) each of the clients is implemented in a separate one of the electronic devices 400 (e.g., in end user devices where the software 428 represents the software to implement clients to interface directly and/or indirectly with the Service discovery and configurations system (e.g., software 428 represents a web browser, a native client, a portal, a command-line interface, and/or an application programming interface (API) based upon protocols such as Simple Object Access Protocol (SOAP), Representational State Transfer (REST), etc.)); 2) the Service discovery and configurations system is implemented in a separate set of one or more of the electronic devices 400 (e.g., a set of one or more server devices where the software 428 represents the software to implement the Service discovery and configurations system); and 3) in operation, the electronic devices implementing the clients and the Service discovery and configurations system would be communicatively coupled (e.g., by a network) and would establish between them (or through one or more other layers and/or or other services) connections for submitting requests to the Service discovery and configurations system and returning response to the clients. Other configurations of electronic devices may be used in other implementations (e.g., an implementation in which the client and the service discovery and configurations system are implemented on a single one of electronic device 400).

During operation, an instance of the software 428 (illustrated as instance 406 and referred to as a software instance; and in the more specific case of an application, as an application instance) is executed. In electronic devices that use compute virtualization, the set of one or more processor(s) 422 typically execute software to instantiate a virtualization layer 408 and one or more software container(s) 404A-404R (e.g., with operating system-level virtualization, the virtualization layer 408 may represent a container engine (such as Docker Engine by Docker, Inc. or rkt in Container Linux by Red Hat, Inc.) running on top of (or integrated into) an operating system, and it allows for the creation of multiple software containers 404A-404R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-404R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 428 is executed within the software container 404A on the virtualization layer 408. In electronic devices where compute virtualization is not used, the instance 406 on top of a host operating system is executed on the "bare metal" electronic device 400. The instantiation of the instance 406, as well as the virtualization layer 408 and software containers 404A-404R if implemented, are collectively referred to as software instance(s) 402.

Alternative implementations of an electronic device may have numerous variations from that described above. For example, customized hardware and/or accelerators might also be used in an electronic device.

Example Environment

Figure 4B:
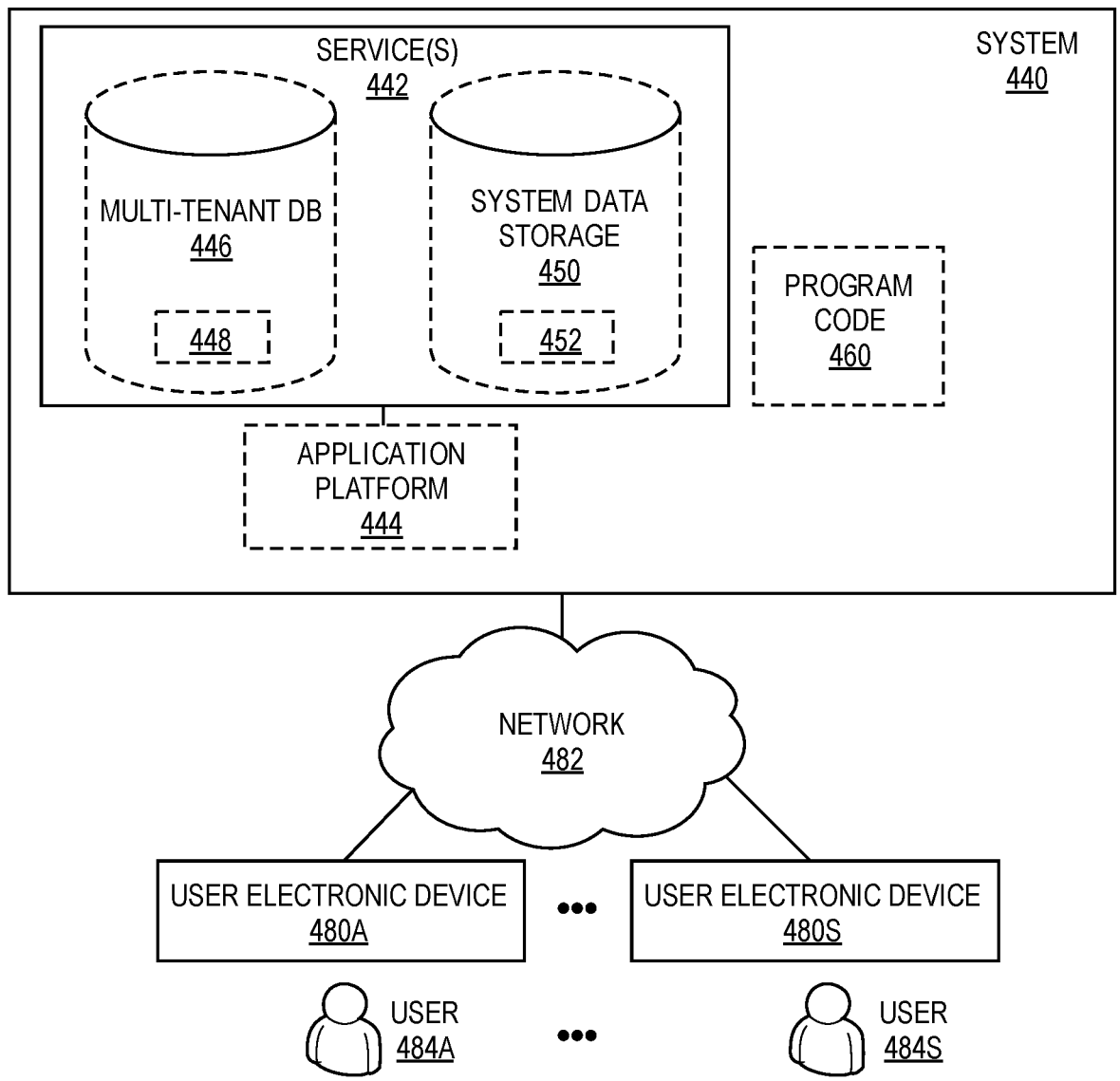
FIG. 4B is a block diagram of a deployment environment according to some example implementations.

FIG. 4B is a block diagram of a deployment environment according to some example implementations. A system 440 includes hardware (e.g., a set of one or more server devices) and software to provide service(s) 442, including the service discovery and configurations system. In some implementations the system 440 is in one or more datacenter(s). These datacenter(s) may be: 1) first party datacenter(s), which are datacenter(s) owned and/or operated by the same entity that provides and/or operates some or all of the software that provides the service(s) 442; and/or 2) third-party datacenter(s), which are datacenter(s) owned and/or operated by one or more different entities than the entity that provides the service(s) 442 (e.g., the different entities may host some or all of the software provided and/or operated by the entity that provides the service(s) 442). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 440 is coupled to user devices 480A-480S over a network 482. The service(s) 442 may be on-demand services that are made available to one or more of the users 484A-484S working for one or more entities other than the entity which owns and/or operates the on-demand services (those users sometimes referred to as outside users) so that those entities need not be concerned with building and/or maintaining a system, but instead may make use of the service(s) 442 when needed (e.g., when needed by the users 484A-484S). The service(s) 442 may communicate with each other and/or with one or more of the user devices 480A-480S via one or more APIs (e.g., a REST API). In some implementations, the user devices 480A-480S are operated by users 484A-484S, and each may be operated as a client device and/or a server device. In some implementations, one or more of the user devices 480A-480S are separate ones of the electronic device 400 or include one or more features of the electronic device 400.

In some implementations, the system 440 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor, or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 440 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 440 may include an application platform 444 that enables PAAS for creating, managing, and executing one or more applications developed by the provider of the application platform 444, users accessing the system 440 via one or more of user devices 480A-480S, or third-party application developers accessing the system 440 via one or more of user devices 480A-480S.

In some implementations, one or more of the service(s) 442 may use one or more multi-tenant databases 446, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user devices 480A-480S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the multi-tenant database(s) 446 and/or system data storage 450.

In some implementations, the service(s) 442 are implemented using virtual applications dynamically created at run time responsive to queries from the user devices 480A-480S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the Service discovery and configurations system, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 440 and the user devices 480A-380S.

Each user device 480A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 440. For example, the user interface device can be used to access data and applications hosted by system 440, and to perform searches on stored data, and otherwise allow one or more of users 484A-384S to interact with various GUI pages that may be presented to the one or more of users 484A-384S. User devices 480A-380S might communicate with system 440 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 480A-380S might include an HTTP client, commonly referred to as a "browser," for sending and receiving HTTP messages to and from server(s) of system 440, thus allowing users 484A-384S of the user devices 480A-380S to access, process and view information, pages and applications available to it from system 440 over network 482.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method for service discovery in a machine learning serving infrastructure, the method comprising:
    detecting initialization of at least one service container;
    establishing a monitor for monitoring label information for the at least one service container using a container orchestration system (COS) application programming interface (API);
    identifying, by the monitor, the label information in the at least one service container;
    collecting the label information for the initializing at least one service container, wherein the label information includes version information of a scoring service provided by the at least one service container;
    storing a mapping between the label information and the at least one service container in a routing information storage accessible to a routing service;
    receiving a request for executing a particular version of the scoring service;

determining, by the routing service, that the request is to be routed to the at least one service container based on the particular version of the scoring service matching the version information included in the label information included in the mapping; and routing, by the routing service, the request to the at least one service container.

2. The method of claim 1, wherein the COS API is a kubernetes API.

3. The method of claim 1, wherein the label information further includes a service name and port information for the at least one service container.

4. The method of claim 1, wherein label information can be cluster based or node based.

5. The method of claim 1, further comprising:

retrieving the label information from a pod specification for node based service discovery or a deployment specification for cluster based service discovery.

6. A non-transitory machine-readable storage medium that provides instructions that, if executed by a set of one or more processors, are configurable to cause the set of one or more processors to perform operations of a method for service discovery in a machine learning serving infrastructure, the operations comprising:

detecting initialization of at least one service container;

establishing a monitor for monitoring label information for the at least one service container using a container orchestration system (COS) application programming interface (API);

identifying, by the monitor, label information in the at least one service container;

collecting the label information for the initializing at least one service container, wherein the label information includes version information of a scoring service provided by the at least one service container;

storing a mapping between the label information and the at least one service container in a routing information storage accessible to a routing service;

receiving a request for executing a particular version of the scoring service;

determining, by the routing service, that the request is to be routed to the at least one service container based on the particular version of the scoring service matching the version information included in the label information included in the mapping; and routing, by the routing service, the request to the at least one service container.

7. The non-transitory machine-readable storage medium of claim 6, wherein the COS API is a kubernetes API.

8. The non-transitory machine-readable storage medium of claim 6, wherein the label information further includes a service name and port information for the at least one service container.

9. The non-transitory machine-readable storage medium of claim 6, wherein label information can be cluster based or node based.

10. The non-transitory machine-readable storage medium of claim 6, the operations further comprising:

retrieving the label information from a pod specification for node based service discovery or a deployment specification for cluster based service discovery.

11. An apparatus comprising:

a set of one or more processors; and a non-transitory machine-readable storage medium that provides instructions that, if executed by the set of one or more processors, are configurable to cause the apparatus to perform operations for service discovery in a machine learning serving infrastructure, the operations comprising, detecting initialization of at least one service container, establishing a monitor for monitoring label information for the at least one service container using a container orchestration system (COS) application programming interface (API), identifying, by the monitor, the label information in the at least one service container, collecting the label information for the initializing at least one service container, wherein the label information includes version information of a scoring service provided by the at least one service container, storing a mapping between the label information and the at least one service container in a routing information storage accessible to a routing service, receiving a request for executing a particular version of the scoring service, determining, by the routing service, that the request is to be routed to the at least one service container based on the particular version of the scoring service matching the version information included in the label information included in the mapping, and routing, by the routing service, the request to the at least one service container.

12. The apparatus of claim 11, wherein the COS API is a kubernetes API.

13. The apparatus of claim 11, wherein the label information further includes a service name and port information for the at least one service container.

14. The apparatus of claim 11, wherein label information can be cluster based or node based.

15. The apparatus of claim 11, the operations further comprising:

retrieving the label information from a pod specification for node based service discovery or a deployment specification for cluster based service discovery.

* * * * *